United States Patent [19]

Araki et al.

[11] E Patent Number: Re. 33,436

[45] Reissued Date of Patent: Nov. 13, 1990

[54] FILM FEEDING SYSTEM OF A CAMERA

[75] Inventors: Kunihiko Araki, Tokyo; Susumu Iguchi, Yokohama; Tadafumi Ohguro, Tokyo; Yoshimi Ono, Kawasaki; Koichi Nishi, Yokohama; Yoshio Fukushima, Tokyo; Satoshi Yamane, Takarazuka; Hirofumi Horigome, Kawasaki, all of Japan

[73] Assignee: Ricoh Company, Ltd., Tokyo, Japan

[21] Appl. No.: 204,011

[22] Filed: Jun. 8, 1988

Related U.S. Patent Documents

Reissue of:

[64] Patent No.: 4,460,256
Issued: Jul. 17, 1984
Appl. No.: 323,686
Filed: Nov. 20, 1981

U.S. Applications:

[63] Continuation of Ser. No. 839,045, Mar. 12, 1986, now Re. 32,850.

[30] Foreign Application Priority Data

| | | | |
|---|---|---|---|
| Nov. 26, 1980 | [JP] | Japan | 55-166105 |
| Nov. 26, 1980 | [JP] | Japan | 55-166106 |
| Nov. 26, 1980 | [JP] | Japan | 55-166107 |
| Nov. 26, 1980 | [JP] | Japan | 55-166108 |
| Nov. 26, 1980 | [JP] | Japan | 55-166109 |
| Nov. 26, 1980 | [JP] | Japan | 55-166110 |
| Nov. 26, 1980 | [JP] | Japan | 55-166111 |
| Nov. 26, 1980 | [JP] | Japan | 55-166112 |
| Nov. 26, 1980 | [JP] | Japan | 55-166113 |

[51] Int. Cl.[5] ..... G03B 1/18; G03B 1/66

[52] U.S. Cl. ..... 354/173.1; 354/214; 354/217

[58] Field of Search ..... 354/173.1, 173.11, 214, 354/268, 171, 217, 484, 475

[56] References Cited

U.S. PATENT DOCUMENTS

| | | | |
|---|---|---|---|
| 3,135,182 | 7/1984 | Hintze | 354/173.1 |
| 3,917,395 | 11/1975 | Ogawa | 354/173.1 |
| 3,981,022 | 9/1976 | Iwashita | 354/171 |
| 4,003,063 | 1/1977 | Takahashi et al. | 354/484 |
| 4,251,148 | 2/1981 | Stemme et al. | 354/214 X |
| 4,272,168 | 6/1981 | Maitani et al. | 354/217 X |
| 4,274,726 | 6/1981 | Yoneyama et al. | 354/173.1 |
| 4,310,233 | 1/1982 | Okuyama et al. | 354/275 X |
| 4,342,509 | 8/1982 | Wakabayashi et al. | 354/173.1 |
| 4,367,026 | 1/1983 | Terada et al. | 354/217 X |
| 4,504,131 | 3/1985 | Kimura | 354/173.1 |

*Primary Examiner*—W. B. Perkey

*Attorney, Agent, or Firm*—Oblon, Spivak, McClelland, Maier & Neustadt

[57] ABSTRACT

A film advancing system of a camera in which a roll of film inside a film cartridge is first wound to a spool and then the film is rewound into the cartridge one frame from another after each photographic operation is provided. The system includes a reversibly rotatable motor the drivement and rotational direction of which are automatically controlled depending upon various conditions of the camera to implement required advancement of the film.

3 Claims, 7 Drawing Sheets

Ⓔ = EMPTY
E = END

| Fig.2C | Fig.2A |
|---|---|
| | Fig.2B |

FILM FEEDING SYSTEM OF A CAMERA

Matter enclosed in heavy brackets [ ] appears in the original patent but forms no part of this reissue specification; matter printed in italics indicates the additions made by reissue.

*This is a continuation of application Ser. No. 06/839,045, filed Mar. 12, 1986 now U.S. Pat. No. Re. 32,850.*

*This is a reissue of application Ser. No. 06/323,686, filed 11/20/81, now U.S. Pat. No. 4,460,256.*

BACKGROUND OF THE INVENTION

1. Field of the Invention

This invention relates to a film feeding or advancing system of a camera and more in particular to a film feeding system of a camera of the type in which upon loading of a film cartridge into the camera, the film inside the cartridge is first wound up to a take-up spool of the camera and then the film is rewound into the cartridge frame by frame after each photographic operation.

2. Description of the Prior Art

Most widely used present day cameras are adapted to use a 35 mm film strip contained in a cartridge in the form of a roll. In order to set such a film cartridge into a camera, the cartridge is placed into the cartridge receiving chamber of the camera body and the leading portion of the film is inserted into the slot of a winding spool which is then rotated to have the leading portion of the film temporarily gripped by the spool. Thus, unexposed frames are contained in the cartridge and the film is wound to the spool frame by frame after each photographic operation. Accordingly, the film portion having exposed frames is wound around the spool and this continues until the frame is used. Upon using all the frames, the film is rewound into the cartridge, which is then removed from the camera for further processing such as developing and printing.

The above-described prior art film feeding system has various disadvantages. First, since the exposed portion of the film is wound to the spool, the photographed images could be destroyed if the back cover of a camera is accidentally opened before rewinding into the cartridge. Second, such prior art cameras are usually provided with a counter which indicates the number of frames used, or pictures taken. This is disadvantageous because the user has to remember the number of remaining exposures since there are several film cartridges in the market which have different numbers of exposures. In order to cope with this problem, there has been proposed a camera provided with a device for indicating the number of remaining exposures. Such a device, however, requires to be set to the maximum number of exposures rated for the film cartridge before use. Thus, such a device is of no use if the operator has forgotten such initial setting.

A third disadvantage of the prior art film feeding system is that after the use of the final frame, the operator might try to forcibly wind the film to the spool so that the perforations provided along both sides of the film could be damaged or the film itself could be torn away in the worst case. If that happens, the film having photographed frames cannot be rewound into the cartridge and thus at least some pictures, which might include a valuable one, will be lost.

SUMMARY OF THE INVENTION

The disadvantages of the prior art are overcome with the present invention and an improved film feeding system of a camera is provided. The present invention is based on the so-called preliminary wind-up system in which upon loading of a film cartridge into a camera, the unused film inside the cartridge is first wound to the spool and then the film is rewound into the cartridge frame by frame after each photographic operation. Such a system is advantageous because the maximum number of possible exposures of the loaded film may be indicated upon loading and the photographed frames are stored in the light-tight cartridge.

Therefore, it is an object of the present invention to provide an improved film feeding system of a camera.

Another object of the present invention is to provide improvements in the preliminary wind-up type film feeding system of a camera.

A further object of the present invention is to provide a film feeding system of a camera the operation of which can be automatically carried out.

A still further object of the present invention is to provide a film feeding system of a camera having various foolproof functions.

Other object, advantages and novel features of the present invention will become apparent from the following detailed description of the invention when considered in conjunction with the accompanying drawings.

DESCRIPTION OF THE PREFERRED EMBODIMENTS

Figure 1:
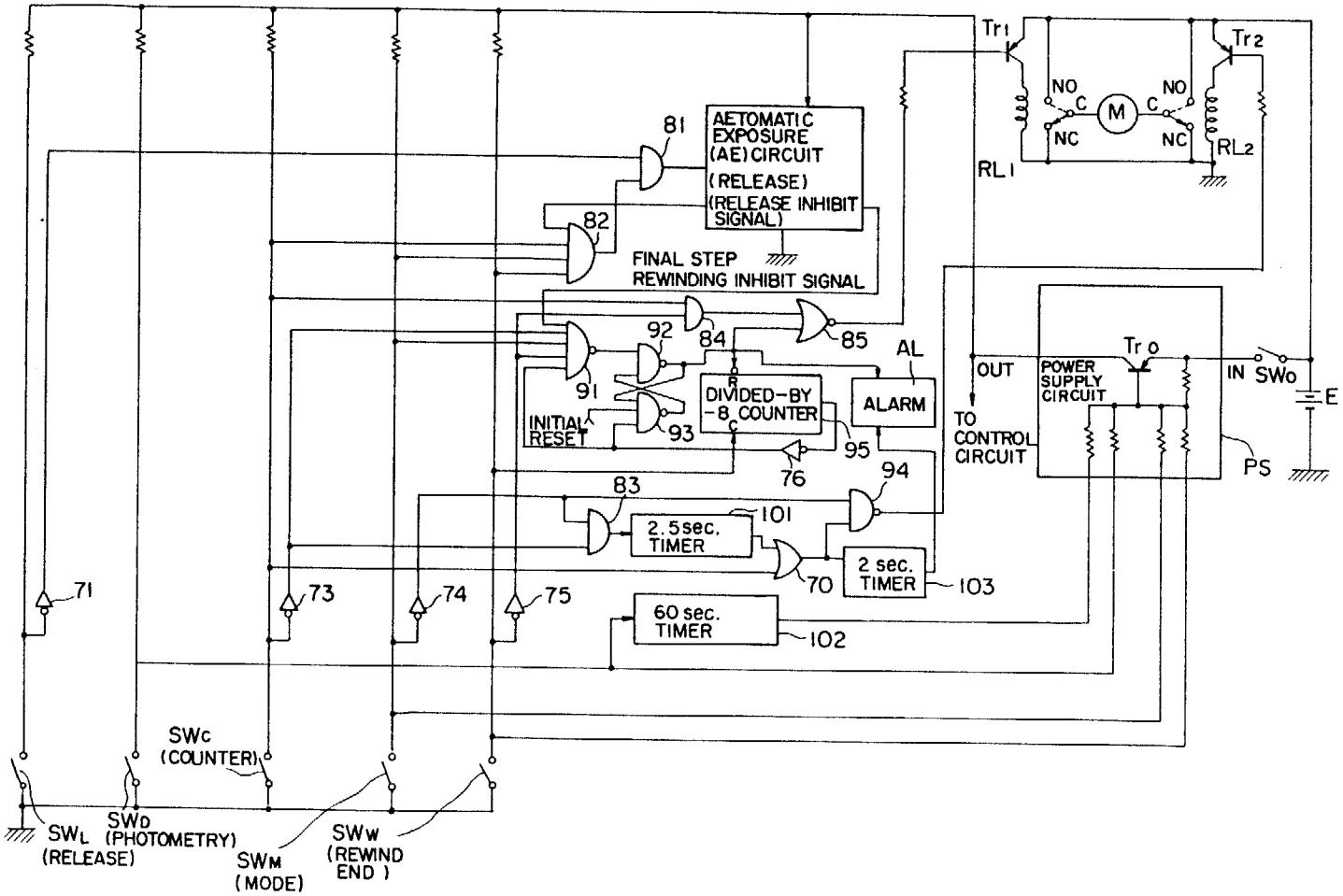
FIG. 1 is a circuit diagram partly in logic symbols showing one embodiment of the present invention.

Referring now to FIG. 1, there is shown a circuit diagram in accordance with one embodiment of the present invention. As shown, the circuit includes a main or power supply switch $SW_O$, a release switch $SW_L$, a photometry switch $SW_D$, a counter switch $SW_C$, a mode switch $SW_M$ and a rewind end switch $SW_W$. The circuit also includes a reversibly rotatable motor M which is a driving source for moving the film in the winding direction, i.e., from the film cartridge to the spool, or in the rewinding direction which is opposite to the winding direction. An automatic exposure (AE) circuit, the structure of which is well known in the art, and an alarm device are also included in the circuit. The operation of the motor M, together with the AE circuit and the alarm device, is controlled by the ON/OFF conditions of the above-described switches.

The main switch $SW_O$ must be closed to supply power from a power source E to a power supply circuit PS. The switch $SW_O$ may be manually operated and it may also be operated by the opening or closing operation of the back cover of a camera. For example, as described below, it may be so structured that one switching position of a dial-type switch is used as a power-off position where the switch $SW_O$ is open and the switch $SW_O$ remains closed when the back cover is open irrespective of the position of the dial-type switch.

A main function of the circuit shown in FIG. 1 is to feed or advance a roll of film in one direction or its opposite direction inside a camera body. In this specification, when the film is advanced to a take-up spool of the camera from a film magazine loaded into the camera prior to any photographic operation, this mode of operation will be referred to as a preliminary winding or wind-up operation; on the other hand, when the film is advanced into the magazine from the spool intermittently after each photographic operation, this mode of operation will be referred to as a rewinding operation since the film is rewound back into the magazine. As will be described in detail later, it is to be noted that the feeding operation of the film is controlled by the ON/OFF conditions of the switches $SW_C$, $SW_M$ and $SW_W$.

Among these three switches, the counter switch $SW_C$ is turned on or off depending upon whether a film cartridge is loaded or not and the result of the comparison between the counted value of the film counter and a predetermined value. The switch $SW_C$ is on when a cartridge is loaded and the counted value of the film counter is "E". On the other hand, the switch $SW_C$ is off when a cartridge is unloaded and the counted value of the film counter is "Ⓔ", or "1" or more. The counted value "E" indicates that the counting is being carried out for that portion of the film which has been pulled out of the cartridge when the cartridge is loaded into the camera and the additional portion of the film which should be pulled out of the cartridge until the first frame of the film is properly located for photographic operation. The former portion corresponds to the indication of "S" and the latter portion corresponds to the indication of two dots, implying two frames to be skipped between "S" and the first frame for photographic operation, in prior art cameras.

It is to be noted that the film counter displays "E" when a cartridge containing therein an unused roll of film is loaded into a camera and during when a length of film corresponding to a frame or two is being wound to the spool after loading. The film counter also displays "E" when all of the frames have been used or when the camera back cover is opened. On the other hand, the counted value "Ⓔ" indicates that no cartridge is loaded, and the operator will recognize the absence of a film cartridge by looking at the counter.

Mode switch $SW_M$ is turned on or off depending upon whether or not a film cartridge is loaded, whether the camera back cover is open or closed and whether or not the preliminary winding operation has been completed. Mode switch $SW_M$ is turned on by closing the back cover after loading a film cartridge. Mode switch $SW_M$ is off if a film cartridge is unloaded, if the back cover is open, or upon completion of the preliminary winding operation.

Rewind end switch $SW_W$ is turned on or off depending upon the condition whether or not the shutter device is set for operation and whether or not the film rewinding operation has been carried out. Switch $SW_W$ is turned on when the second blind of the shutter comes into the closed position after the completion of the shutter operation; whereas, switch $SW_W$ is turned off upon completion of the film rewinding operation and the shutter setting operation.

Aside from three switches $SW_C$, $SW_M$ and $SW_W$ which are directly related to the film feeding operation as described above, the circuit includes two more switches: release switch $SW_L$ and photometry switch $SW_D$, as shown in FIG. 1. These latter switches are usually provided in prior art cameras, and both of them are operated in association with the operation of the release button such that switch $SW_D$ is first turned on when the release button is pushed into a first stroke position and then switch $SW_L$ is turned on when the release button is further pushed into a second stroke position. Both of switches $SW_D$ and $SW_L$ are turned off when the release button returns to its original position.

As will be understood later, the above-mentioned switches are operated to control the operation of power supply circuit PS, automatic exposure circuit AE and film-feed driving motor M. It is to be noted that, in the circuit of FIG. 1, all of the components such as timers, flipflop and counter are initialized upon activation of power supply circuit PS.

Figure 3:
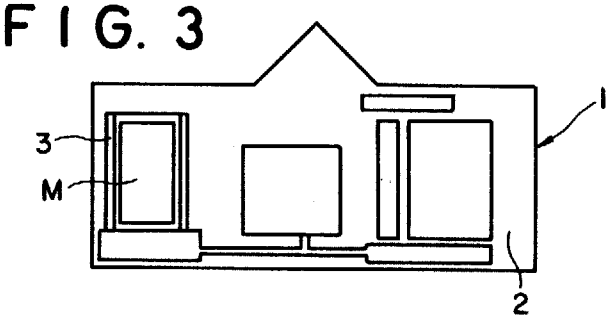
FIG. 3 is a schematic illustration showing the interior structure of a camera to which the present film feeding system is incorporated.
Figure 4:
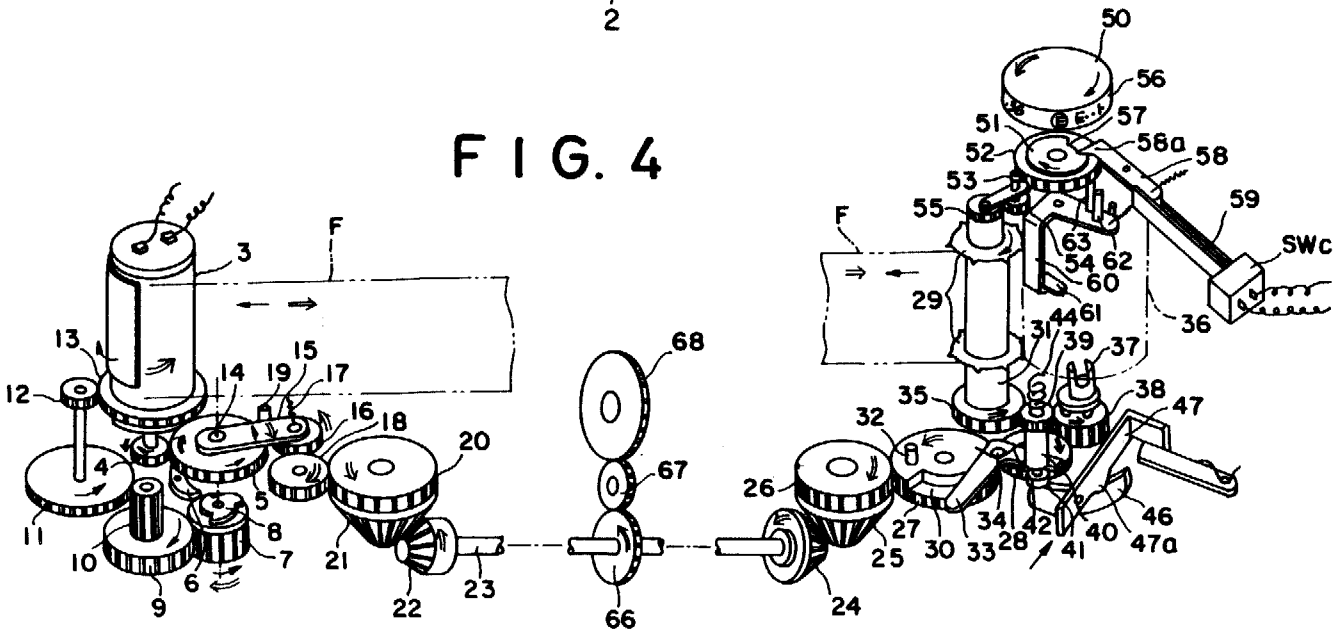
FIG. 4 is a perspective view which schematically illustrates the mechanical structure of one embodiment of the present invention.

A specific structure embodying the mechanical aspect of the present film feeding system is shown in FIGS. 3 and 4 in which FIG. 3 shows the general arrangement of the film feeding system in a camera and FIG. 4 shows the detailed driving mechanism the operation of which is controlled by the circuit shown in FIG. 1.

As shown in FIG. 3, a camera body 1 is provided with a film cartridge receiving chamber 2 at one end, and a take-up spool 3 is rotatably supported at the opposite end. A reversibly rotatable motor M is disposed inside the spool 3 thereby the spool 3 is driven to rotate in one direction or the opposite direction by means of motor M.

Referring now to FIG. 4, a detailed description of the driving mechanism will be made. As may be already noted, use is made of two different kinds of arrows to indicate the direction of movement of most of the movable elements in FIG. 4. Single line arrows indicate the direction of movement of the elements when the mechanism is in the preliminary winding mode; whereas, double line arrows indicate the direction when the mechanism is in the rewinding mode, i.e., the film moving intermittently into the cartridge after each photographic operation.

At the bottom end of the driving shaft which extends downward from motor M is fixedly mounted an output gear 4 which is in mesh with a clutch gear 5 of the driving side. On the bottom surface of the clutch gear 5 is pivoted a pawl 6 which is engageable with a ratchet wheel 8 fixedly mounted on the top surface of a clutch gear 7 which is provided coaxially with the clutch gear 5 on the driven side.

The clutch gear 7 is operatively associated with the gear 13 fixedly mounted on the spool 3 through a reduction gear chain which includes gears 9, 10, 11 and 12. In the preliminary winding mode, i.e., when the gear 4 rotates in the clockwise direction as viewing into FIG. 4, the pawl 6 becomes latched with the ratchet wheel 8 and therefore a rotating force is transferred to the clutch gear 7 on the driven side. In the rewinding mode, i.e., when the output gear 4 rotates in the opposite or counterclockwise direction, the spool 3 rotates as pulled by the film F so that the gear 7 rotates in the clockwise direction as indicated by the double line arrow through gears 13, 12, 11, 10 and 9. However, since it is so structured that the clutch gear 7 having the ratchet wheel 8 on the driven side rotates slower than the clutch gear 5 having the pawl 6 on the driving side, the pawl 6 does not become latched with the ratchet wheel 8. It is to be noted that use may be made of any one-way clutches employing balls or rollers instead of the pawl for the above-described clutching function.

An arm 15 is friction-coupled to the shaft 14 on which the clutch gear 5 is fixedly mounted. The arm 15 rotatably supports a gear 16 which is always in mesh with the clutch gear 5. The arm 15 is biased by a spring 17 such that the gear 16 tends to move away from an intermediate gear 18 thereby the arm 15 abuts against a stopper pin 19. From the intermediate gear 18, the power is transmitted to the sprocket 29 through a gear 20, a bevel gear 21 which is integral with the gear 20, a bevel gear 22 which is in mesh with the gear 21, a shaft 23, bevel gears 24 and 25, and gears 26, 27, 28, 38, 39 and 35.

It is to be noted that the gear 27 is provided with a recess 30 along a part of the periphery or its top surface. Thus, when that part of the gear 27 in correspondence with the recess 30 is in mesh with the gear 28, a rotating force is transmitted to the sprocket 29 and to the rotatable forked shaft 37 for a period of time required to move the film F over the distance corresponding to a single frame. On the top surface of the gear 27 is planted a pin 32 which may be brought into engagement with an L-shaped arm 33, which is pivotally supported by a shaft 34, as the gear 27 rotates.

An idler gear 39 is provided to be meshed between a gear 35 fixedly mounted on the shaft 31 of the sprocket 29 and a gear 38 fixedly mounted on the rotatable and fork-shaped shaft 37 which is engageable with the shaft (not shown) of the film cartridge 36. The idler 39 is rotatably mounted on a vertically movable shaft 40 which is provided with an annular recess 41. The L-shaped arm 33 is biased in the clockwise direction by means of a spring 42 so that the right-hand portion of the arm 33 may be brought into engagement with the recess 41. As understood, the idler 39 may be engaged with or disengaged from the gears 35 and 38, and, when the arm 33 is disengaged from the annular recess 41 of the arm 33, the shaft 40 and therefore the gear 39 moves downward by means of the spring 44 to come into engagement with the gears 35 and 38, thereby the rotation of the gear 28 may be transmitted to the sprocket 29 and to the rotatable fork-shaped shaft 37, the state of which is shown in FIG. 4.

The bottom end of the shaft 40 on which the idler 39 is fixedly mounted abuts against the forward end of a push-up lever 46, the backward end of which is in sliding contact with a lever 47 which is actuated when the back cover of the camera is closed. Upon closing of the back cover, a projection 47a, which projects downwardly from the lever 47, pushes the backward end of the lever 46 downward, thereby the shaft 40 is lowered to bring the arm 33 into engagement with the annular recess 41. As a result, the idler 39 is disengaged from the gears 35 and 38 so that no driving force is supplied to the sprocket 29 and to the shaft 37.

A counter plate 50 and a cam 51 are fixedly mounted on a common shaft, and a counter gear 52 is disposed coaxially with the cam 51. A single-toothed gear 53 is in mesh with the counter gear 52. To the shaft of the single-toothed gear 53 is fixedly mounted a gear 54 which is in mesh with a gear 55 fixedly mounted at the top of the shaft of the sprocket 29. Thus, one rotation of the sprocket 29 causes to rotate the counter plate 50 by an amount that the next position of the scale 56 may be displayed.

A recess 57 is provided at a part of the periphery of the cam 51 and one end 58a of an actuator member 58 which actuates the counter switch $SW_C$ may come into engagement with the recess 57. The other end of the actuator member 58 is in abutment against a contact member 59 of the switch $SW_C$. Thus, when the ends 58a of the actuator member 58 is in engagement with the recess 57, the counter switch $SW_C$ is on; whereas, it is turned off when the end 58a is disengaged from the recess 57. The peripheral length of the recess 57 is determined such that it corresponds to the length of the first two frames, which are not used for photographic operation, from the position "E" on the scale 56. This corresponds to the total length of the first three frames from the leader portion of the leading edge of the film F in prior art cameras.

In the neighborhood of the film cartridge receiving chamber 2 is pivotally provided a cartridge detecting member 60 which has a detecting tab 61 at its bottom end. The detecting member 60 is so biased that it tends to pivot to bring the detecting tab 61 into the chamber 2. The detecting member 60 is also provided with an upstanding pin 62 which is engageable with a pin 63 depending from the bottom surface of the counter gear 52. It is to be noted that the counter plate 50 is biased by a spring (not shown) such that it tends to rotate counterclockwise. Thus, in the absence of the cartridge 36, i.e., when the detecting tab 61 projects into the chamber 2, or during the time when the film is not fed after loading of the cartridge, the pins 62 and 63 are in engagement. As will be understood later, the movement of the detecting member 60 will be used to control the ON/OFF operation of the counter switch $SW_C$. It may be worth noting in passing that in the case of a singlereflex camera, there should be provided a gear train comprised of gears 66, 67 and 68 which allows to carry out the quick returning motion of the mirror and to set a shutter mechanism. Such a gear train should be brought into operative association with the shaft 23 while it is in the rewinding mode.

Figures 2, 2A:
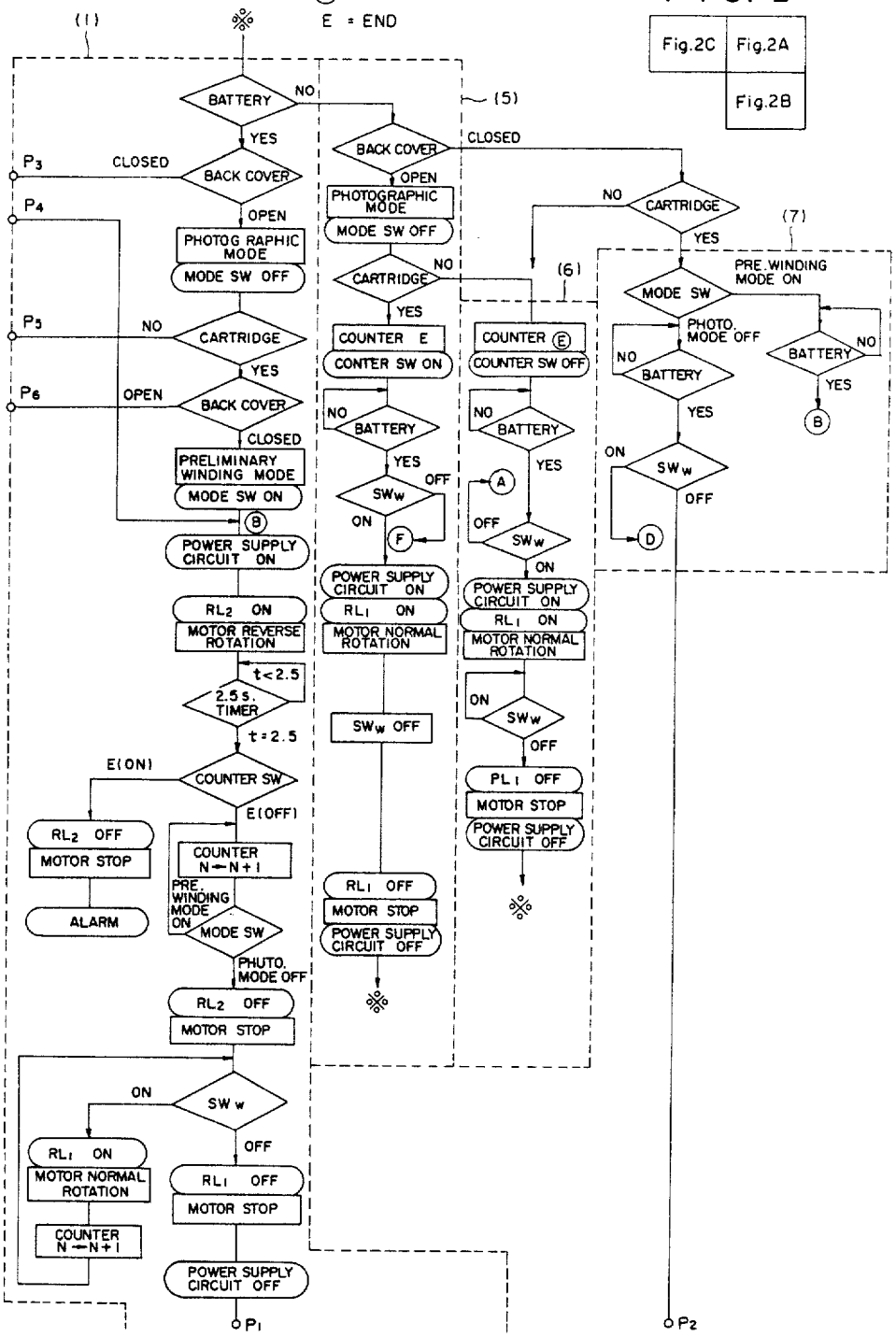
FIG. 2 is a schematic illustration showing how FIGS. 2A through C should be combined.
FIGS. 2A through C together form a flow chart showing several possible sequences of operation which may be implemented by the circuit shown in FIG. 1.
Figure 2B:
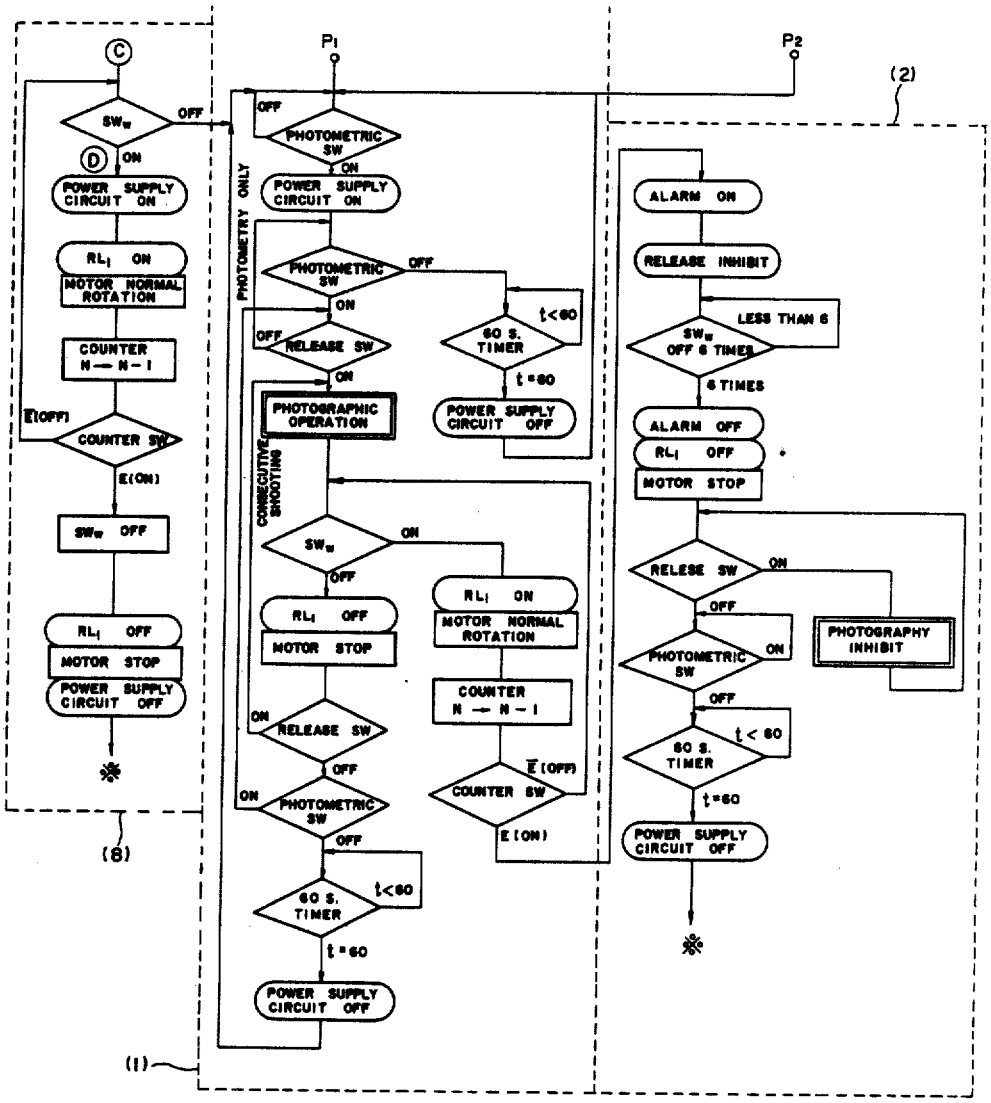
Figure 2C:
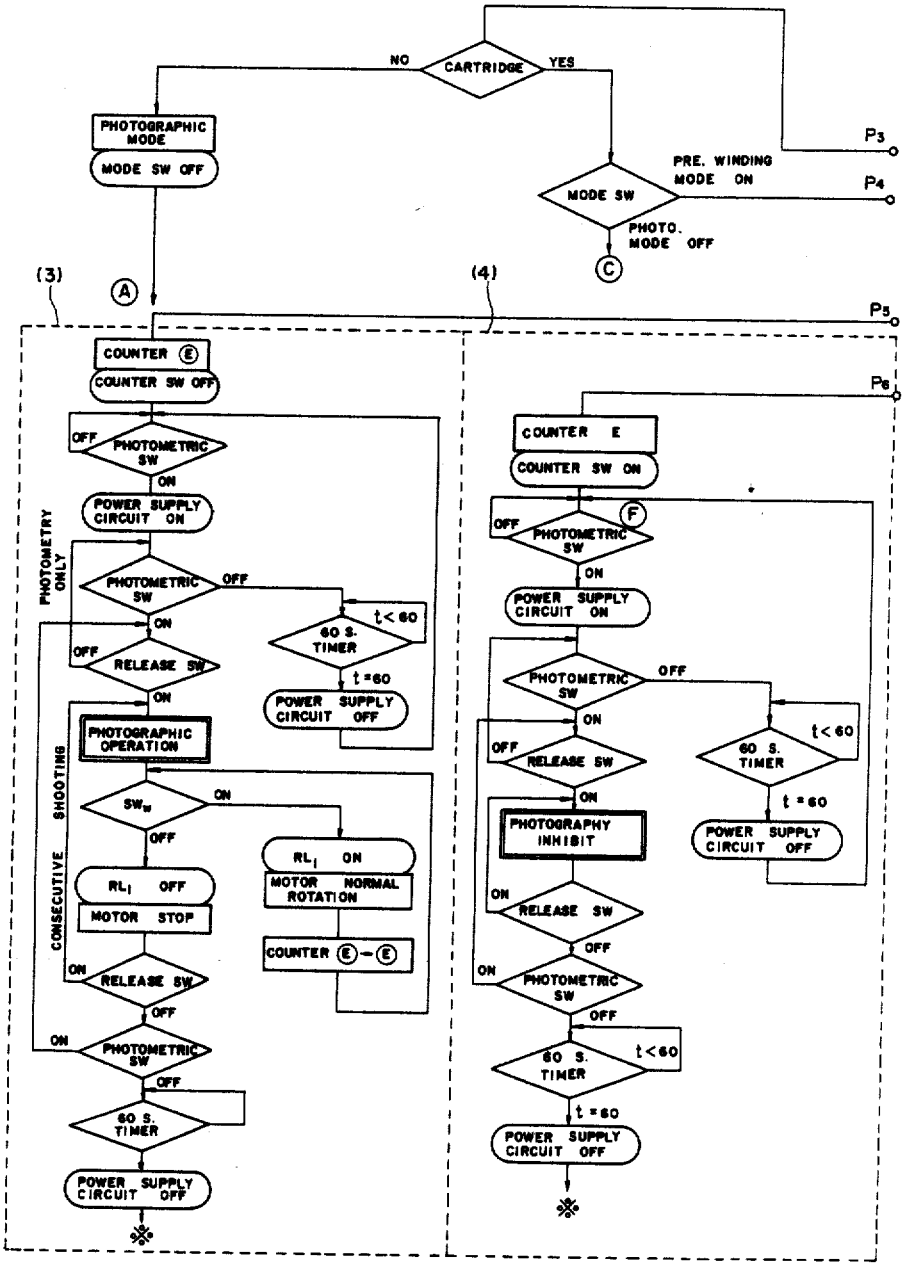

Now, description will be had with respect to the operation of the present invention with reference to the circuit diagram shown in FIG. 1, the flow charts shown in FIGS. 2A-2C and the driving mechanism shown in FIG. 4.

(1) Normal Photographic Mode

This mode corresponds to routine (1) in FIGS. 2A and B. If the main switch $SW_O$ is closed after installing a battery into a camera and the back cover is opened for the loading of film F, then the mode switch $SW_M$ is off, and this condition will be refered to as a photographic mode. Since the cartridge is absent in the above condition, the counter switch $SW_C$ is maintained off. Under the condition, when the cartridge 36 is loaded, the detecting tab 61 of the detecting member 60 is pushed out of the chamber 2, or the detecting member 60 is rotated clockwise as viewing into FIG. 4 so that the pin 62 forces to move the pin 63 of the counter gear 52 thereby the counter switch $SW_C$ is turned on, and this state is shown in FIG. 4.

Then, having the leading portion of the film F grabed by the spool 3 to complete the loading of the film F. At this time, since the counter switch $SW_C$ is on as described above, an OR gate 70 receives a low signal or "Lo" at its one input and an inverter 73 supplies a high signal or "Hi" which then supplies "Hi" to one input of an AND gate 83.

Next, closing of the back cover will turn the mode switch $SW_M$ on thereby turning on a transistor $Tr_0$ of the power supply circuit PS to supply power to the automatic exposure circuit and various other circuit components. At the same time, "Hi" is supplied to one input of each of an AND gate 83 and a NAND gate 94 through an inverter 74. Thus, the AND gate 83 supplies "Hi" to a timer 101. When "Hi" is supplied to its input, the timer 101 changes the state of its output from "Lo" to "Hi" and the "Hi" state is maintained for a predetermined period of time, e.g., 2.5 seconds. After elapsing such a time period, the output of the timer 101 goes back to the "Lo" state.

When "Hi" is supplied from the AND gate 83 to the timer 101, the output of the timer 101 becomes "Hi", which is then supplied to the other input of the OR gate 70, the output of which, in turn, supplies "Hi" to the other input of the NAND gate 94 so that the NAND gate 94 supplies "Lo" to the base of a transistor $Tr_2$ in the motor driving control circuit. Under the condition, the transistor $Tr_2$ is turned on to energize a relay $RL_2$ which then switches its contact from NC to NO thereby passing a current through the motor M to establish reverse rotation.

When the motor M rotates in the reverse direction, its output gear 4 rotates in the direction indicated by the single line arrow and the clutch gear 5 on the driving side rotates in the counter-clockwise direction as indicated by the single line arrow. Thus, the pawl 6 comes into engagement with the ratchet wheel 8 of the clutch gear 7 on the driven side so that the gear 7 is rotated in the direction indicated by the single line arrow. As a result, the driving force is transmitted through a reduction gear chain comprised of gears 9, 10, 11, 12 and 13 to rotate the spool 3 in the clockwise direction so that the film thus loaded is pulled out of the cartridge and wound to the spool 3.

During such preliminary winding operation, the sprocket 29 is caused to rotate through engagement with the perforations of the film F. Thus, the single-toothed gear 53 is rotated through the gear 55 fixedly mounted to the top of the shaft of the sprocket 29 to cause the rotation of the cam 51 and the counter plate 50 thereby displaying the maximum number of exposures of the film F on the scale 56. At the same time, the forward end 58a of the actuating member 58 is moved out of the recess 57 of the cam 51 and the pivotal motion of the actuating member 58 causes the counter switch $SW_C$ to be turned off.

While the sprocket 29 is being rotated by the feeding motion of the film F, a driving force is normally not applied to the driving mechanism of the rewinding system because the idler 39 is in a disengaged state when the back cover is closed as described above. It may happen, though it is highly unlikely, that the pin 32 of the gear 27 is in abutment against the arm 33 to establish an engaged state for the idler 39. At the time, however, the recess 30 of the gear 27 is aligned with the gear 28 to prevent a driving force from being applied to the driving mechanism of the rewinding system.

When the counter switch $SW_C$ is turned off as described above, one input of the OR gate 70 receives "Hi", and, therefore, even if the output of the timer 101 returns to "Lo" from "Hi" after elapsing a predetermined period of time, the output of the OR gate 70 remains "Hi". Accordingly, both of the inputs to the NAND gate 94 remain "Hi", and its output remains "Lo." As a result, the motor M rotates in the reverse direction to continue its preliminary winding operation.

If the switch $SW_C$ remains on even after elapsing a predetermined period of time, i.e., 2.5 seconds in the present embodiment, as from the initiation of the reverse rotation of the motor M due to incomplete film loading and the like, the output of the timer 101 changes its state from "Hi" to "Lo", which then establishes "Lo" to both of the inputs to the OR gate 70 with its output changed to "Lo." For this reason, "Lo" is applied to one input of the NAND gate 94. As a result, the NAND gate 94 supplies "Hi" to its output so that the transistor $Tr_2$ in the film feeding control circuit is turned off to deenergize the relay $RL_2$ whereby the contact is switched from NO to NC to short-circuit the two terminals of the motor M. Thus, the motor M immediately stops its rotation. At the same time, the output "Lo" from the OR gate 70 is also supplied to the input of a timer 103 and therefore the timer 103 supplies "Hi" to the alarm circuit AL, say for two seconds. Such an alarm indicates that the preliminary winding operation has not been carried out even though the film feeding control circuit established a current passing through the motor M. In such a case, it is required for the operator to repeat the film loading operation by opening the back cover of the camera.

If the film loading has been properly done, the motor M of the film feeding control circuit is rotated in the reverse direction to carry out the preliminary winding operation until its film end is reached. Upon reaching the film end, a tension is generated in the film F since its end is fixed to the shaft of the cartridge 36. Upon detection of such tension, the mode switch $SW_M$ is turned off to supply "Lo" to one input of the NAND gate 94 through the inverter 74. Thus the output of the NAND gate 94 becomes "Hi" so that the transistor $Tr_2$ of the film feeding control circuit is turned off. Accordingly, the relay $RL_2$ becomes deenergized to switch its contact from NO to NC and thus the motor M stops its rotation.

Various structures such as clutches may be employed to detect the tension produced in the film F as shown in FIGS. 8-11. For example, one such clutch may be comprised of a driving plate 172, a driven plate 171 which may be operatively associated with the driving plate 172 and balls 177 interposed between said driving 172 and driven 171 plates. The driving plate 172 is provided with a plurality of arc-shaped grooves 172a of the same radius and length and the driven plate 171 is provided with a plurality of holes 171a equidistantly spaced apart from each other for holding therein the individual balls 177. The driving 172 and driven 171 plates are biased toward each other, for example, by springs 173 provided on the driving plate 172.

With such a clutch, the driving 172 and driven 171 plates rotate in unison as long as no resistive force due to tension produced in the film F is applied to the driven plate 171. However, when the driven plate 171 stops its rotation by receiving the resistive force, the balls 177 move out of the arc-shaped grooves 172a so that the driving plate 172 moves away from the driven plate 171. Such a movement of the driving plate 172 may be used to operate the mode switch $SW_M$.

Upon completion of such a preliminary rewinding operation, the subsequent mode of operation differs depending upon the condition whether the rewind end switch $SW_W$ is on or off. As explained previously, the rewind end switch $SW_W$ is on if the second blind of the shutter takes the closed position upon completion of the shutter operation; whereas, the switch $SW_W$ is off if the film F is rewound and the shutter is reset. Thus, the switch $SW_W$ is normally off at the time of completion of the preliminary winding operation; however, it may be on, though it is a very rare case. In other words, such an on-condition is established if the battery is removed during the film rewinding operation prior to the preliminary winding operation, and the back cover is closed after loading a film cartridge, followed by the installment of a battery. As long as a battery is present, the main switch $SW_O$ is turned on if the back cover is opened, for example, for film loading even if the main switch has been set to the off state. If the system is in a film rewinding mode when the main switch $SW_O$ is turned on, the film rewinding operation continues bacause the rewind end switch $SW_W$ is on, and the rewind end switch $SW_W$ is turned off when the film rewinding operation has been completed. Therefore, it is very rare that the rewind end switch $SW_W$ is on at the time of completion of the preliminary winding operation.

Although it is a rare case, if the rewind end switch $SW_W$ is on, "Hi" is supplied to one input of the NOR gate 85 through the inverter 75 and the AND gate 84. Thus the NOR gate 85 supplies "Lo" as its output so that the transistor $Tr_1$ is turned on to cause the relay $RL_1$ energized. Because of this, the contact of the relay $RL_1$ is switched from NC to NO to draw a current through the motor M to establish its normal rotation. When the motor M rotates in the normal direction, the film F which has been wound to the spool 3 is again rewound into the cartridge 36. If the film F is rewound into the cartridge 36 over a length less than a frame worth, the shutter device is set for operation and the rewind end switch $SW_W$ is turned off. Therefore, "Lo" is applied to either of the two inputs to the NOR gate 85 the output of which supplies "Hi" so that the transistor $Tr_1$ of the film feeding control circuit is turned off to stop the rotation of the motor M. On the other hand, if the rewind end switch $SW_W$ is off at the time of completion of the preliminary winding operation, the circuit ceases its function at the time when the motor M has stopped its reverse rotation without implementing the film rewinding operation. Under the condition, a photographic operation may be carried out immediately. In other words, the system is now ready for taking pictures. In this manner, upon completion of the preliminary winding, the counter plate 50 displays the maximum number of exposures, e.g., 36, 24 or 12, available for the film F thus loaded.

In order to carry out a photographic operation, the release button (not shown) of the camera must be depressed to turn the photometry switch $SW_D$ on. By doing so, "Lo" is applied to the base of the transistor $Tr_0$ of the power supply circuit PS so that power may be supplied to the AE circuit and the other components of the system. If the release button is allowed to return its original position, then the switch $SW_D$ is opened so that the power supply circuit is deactivated.

On the other hand, if the release button is further depressed to turn the release switch $SW_L$ on, "Hi" is applied to one input of the AND gate 81 through the inverter 71 and "Hi" is also applied to the other input of the AND gate 81 from the AND gate 82 thereby a release operation is carried out. The AND gate 82 receives "Hi" when all of the switches $SW_C$, $SW_M$ and $SW_W$ are off, and it supplies "Hi" to one input of the AND gate 81 when it receives "Hi" from the AE circuit at the release enable period. At the time when the preparation for a photographic operation has been completed, all of the switches $SW_C$, $SW_M$ and $SW_W$ are off. Besides, since the AE circuit is releasable except when a release operation has been proceeding, all of the four inputs to the AND gate 82 are "Hi" and thus the two inputs to the AND gate 81 are also "Hi" so that "Hi" is supplied to the AE circuit thereby a release operation or photographic operation is carried out.

If a photographic operation is carried out and the second blind of the shutter takes the closed position, the rewind end switch $SW_W$ is turned on to apply "Lo" to the transistor $Tr_1$ of the film feeding control circuit through the inverter 75 and the NOR gate 85 and therefore the transistor $Tr_1$ is turned on to cause the relay $RL_1$ energized. Accordingly, the motor M is set in normal rotation to move the photographed frame into the cartridge. During this rewinding operation, since the rewind end switch $SW_W$ is on, the AND gate 82 supplies "Lo" to the AND gate 81 so that the AE circuit is prevented from being released. Having the film rewound by a single frame, the rewind end switch $SW_W$ is turned off when the shutter device is reset so that the transistor $Tr_1$ of the film feeding control circuit is turned off to deenergize the relay $RL_1$ thereby stopping the motor M. At this time, if the release switch $SW_L$ is on, "Hi" is applied to one input of the AND gate 81 through the inverter 71 and "Hi" is also applied to the other input of the AND gate 81 from the AND gate 82 so that the AND gate 81 supplies "Hi" to the AE circuit to carry out a release operation. In other words, if the release switch $SW_L$ is kept on during the film rewinding operation, so-called consecutive shooting takes place.

If the release switch $SW_L$ is off and the photometry switch $SW_D$ is on, the power supply circuit supplies power only to the AE circuit for carrying out a photometric operation. Then, if the photometry switch $SW_D$ is also turned off, the timer 102 supplies a signal to the power supply circuit for a predetermined period of time, e.g., 60 seconds, as from such turn-off point in time so that the photometric operation takes place continuously only for 60 seconds. During the above-described photographic operation, the motor M rotates in the direction opposite to that of the preliminary winding mode as triggered by a release action, and, therefore, the output gear 4 rotates in the direction indicated by the double line arrow so that the clutch gear 5, on the driving side, which is in mesh with the output gear 4 rotates in the clockwise direction as indicated by the double line arrow. Thus the pawl 6 is moved out of the way by the ratchet wheel 8 of the clutch gear 7 on the driven side thereby removing the constraint of the gear 5. Moreover, since the clutch gear 5 on the driving side rotates in the clockwise direction, the arm 15 which is in integral with the gear 5 also rotates in the clockwise direction so that the gear 16 rotatably supported by the arm 15 is brought into engagement with the intermediate gear 18.

Under the condition, the rotation of the motor M is transmitted to the gear 27 through the intermediate gear 18, gear 20, bevel gears 21 and 22, shaft 23, bevel gears 24 and 25, and gear 26 thereby turning the gear 27 in the counter-clockwise direction. When the gear 27 rotates counter-clockwise, the gear 28 rotates clockwise; however, since the recess 30 is provided on the gear 27, the gear 28 rotates intermittently. And, during the time in which the gear 28 is in rotation, the shaft 31 of the sprocket 29 is rotated counter-clockwise through the idler 39 to rewind the film F frame by frame and at the same time the fork-shaped shaft 37 is rotated to take up the film F around the shaft of the cartridge 36.

It is to be noted that each time when the film rewinding over the length of a frame is carried out upon turning on of the rewind end switch $SW_W$ after a release operation, the single-toothed gear 53 is rotated through the gear 55 in response to the rotation of the sprocket 29 so that the counter gear 52 is rotated over a single tooth per frame to decrease the displayed number of exposures one by one thereby indicating the number of remaining exposures or unused frames. As described above, the number of the film counter to be displayed decreases one by one after each photographic operation and when "E" is displayed after using all the frames of the film F, the counter switch $SW_C$ is turned on to establish a final step rewinding mode. During the above-described operation, the quick returning operation of the mirror and the shutter resetting operation take place through the gears 66, 67 and 68 each time when the film is advanced from frame to frame.

(2) Final Step Rewinding Mode

This mode corresponds to the routine (2) shown in FIG. 2B. This mode is established when the rewind end switch $SW_W$ is turned on due to the movement of the shutter second blind upon completion of a photographic operation and when the counter switch $SW_C$ is turned on due to the engagement between the forward end 58a and the recess 57 of the cam 51 with the counter plate showing none of a remaining frame. That is, when both of the switches $SW_W$ and $SW_C$ are turned on, "Hi" are applied to two inputs of the NAND gate 91 through the inverters 75 and 73. At the same time, a third input applied to the NAND gate 91 through the mode switch $SW_M$, which is now off, is "Hi", and a fourth input applied from the divide-by-8 counter 95 through the inverter 76 is "Hi" with the final input which is a final step rewinding inhibit signal from the AE circuit being "Hi[ as will be described later. As a result, the input of the NAND gate 92 which forms a flipflop together with the NAND gate 93 receives "Lo" and therefore its output is "Hi." When "Hi" is supplied to the input of the NOR gate 85 the output of which is "Lo", which, in turn, is supplied to the transistor $Tr_1$ of the film feeding control circuit. Thus the relay $RL_1$ is energized to rotate the motor M in the normal direction to rewind the film F into the cartridge 36. At the same time, the output from the NAND gate 92 is supplied to the input R of the divide-by-8 counter to establish a count enable condition thereon and the alarm circuit AL is actuated to give a warning to the operator.

When the film has been rewound, the rewind end switch $SW_W$ is turned off and a single pulse is applied to the input C of the counter 95. During this time, since the motor M continues its normal rotation, the film is fed continuously and the counter 95 increments its counted value by one each time when the rewind end switch $SW_W$ is turned off as the film travels a frame-to-frame distance. When the counted value of the counter 95 has reached the number "8", the counter 95 supplies "Hi" as its output which is then converted to "Lo" by the inverter 76 and supplied to the NAND gate 91 and to the NAND gate 93. Thus, the output from the NAND gate 91 becomes "Hi" and the output from the NAND gate 92 becomes "Lo" thereby the counter 95 stops its counting operation and the alarm circuit AL stops its alarming operation together with cessation of the motor M. In the final step rewinding mode, the motor M is rotated to rewind the film F over the total length of eight frames. It is to be noted however that the number should not be limited to 8 but it can be determined appropriately in view of the fact that usually first 4 or 5 frames become useless at the time of film loading into the camera and thus it is preferable to determine the length for final step rewinding a little more than 4 or 5 frames.

Upon completion of the final step rewinding operation, no photographic operation can take place even if the release switch $SW_L$ is turned on. This is because since the AND gate 82 supplies "Lo" to the AND gate 81 when the counter switch $SW_C$ is turned on, the AND gate 81 also supplies "Lo" as its output thereby establishing the "PHOTOGRAPHY INHIBIT" condition. However, it is to be noted that the photometric operation takes place when the photometry switch $SW_D$ is turned on. And with the photometry switch $SW_D$ turned off, the power supply circuit is deactivated when the timer 102 has closed to supply its output after elapsing 60 seconds. When the alarm stops its operation, the back cover of the camera may be opened for removal of the film cartridge containing therein the photographed film, and, if necessary, another film cartridge containing therein unused film may be loaded.

The alarm circuit AL may be connected to the output of the counter 95 instead of the NAND gate 92 thereby an alarm is produced when the counted value of the counter 95 has reached "8" to indicate to the operator that the film cartridge be removed.

It is to be noted further that various alternative structures to implement the final step rewinding operation are possible. For example, it may be so structured to detect the movement of the film while it is being rewound and the drivement of the motor M may be stopped when the stationary condition of the film is detected, i.e., when all of the film has been rewound into the cartridge. Alternatively, it may be so structured to continue drivement of the motor M for a predetermined period of time which is long enough to rewind the remaining portion of the film into the cartridge.

(3) Checking Mode

This mode corresponds to the routine (3) shown in FIG. 2C. This is the mode in which a photographic operation may take place without film for the purpose of checking.

In this mode, since a film cartridge is not loaded, the mode switch $SW_M$ remains off. The counter plate displays " Ⓔ " and the counter switch $SW_C$ is off. The rewind end switch $SW_W$ is also off. Since the mode switch $SW_M$ is not turned on, a photographic operation may take place without the operation of preliminary winding. This is, if the release button is depressed with photometry switch $SW_D$ actutaes the AE circuitfor the the main switch $SW_O$ on, the turning on of the photometric operation to take place, and if the release switch $SW_L$ is turned on, the AND gate 81 receives "Hi" at both of its inputs thereby allowing a photographic operation to take place.

When a photographic operation has been carried out, the rewind end switch $SW_W$ is turned on to supply "Lo" to the transistor $Tr_1$ of the film feeding control circuit through the inverter 75, AND gate 84 and NOR gate 85 so that the relay $RL_1$ is energized to rotate the motor M in the normal direction. However, since film is not loaded in the present mode, no actual film feeding operation takes place and the counter display remains " Ⓔ " and the counter switch $SW_C$ remains open or off.

When the motor M rotates in the normal direction, the rewind end switch $SW_W$ is again turned off, as will be described later, even though film feeding does not actually take place. Thus all of the inputs to the AND gate 82 become "Hi" to supply "Hi" to the AND gate 81 so that a photographic operation may be carried out by turning the release switch $SW_L$ on. Then when the release button is allowed to return to its original position, the power supply circuit is deactivated by means of the timer 102 after elapsing 60 seconds.

The above-described modes of operation of the present invention are those which include a photographic operation. It is true however that there are other modes of operation which are required for certain characteristics of a camera and which are usually directed to the foolproof purpose as will be described below.

(4) Foolproof Mode of Operation I

This is the mode of operation when the back cover of the camera is opened at the time of or upon completion of film loading. As soon as the back cover is opened, the film counter displays "E" and the counter switch $SW_C$ is turned on. Thus, the AND gate 82 receives "Lo" as one input to supply "Lo" as its output and therefore the AND gate 81 does not supply a release signal to the AE circuit. Accordingly, a photographic operation does not take place even if the release switch $SW_L$ is turned on; in other words, the condition of "photography inhibit" is established. It is to be noted, however, that the photometric operation takes place when the photometric switch $SW_D$ is turned on. When the photometry switch $SW_D$ is turned off, the power supply circuit is deactivated after elapsing 60 seconds as from the turn-off point of the switch $SW_D$.

On the other hand, suppose that the camera is now in the rewinding condition because the back cover has been closed after completion of film loading and the mode switch $SW_M$ has been turned off. Under the condition, if the back cover is accidentally opened, the mode switch $SW_M$ will remain off even if the back cover is closed again. This is, once the mode switch $SW_M$ has been switched from the on-condition to the off-condition by the use of the film end, the switch $SW_M$ is so structured that it maintains the off-condition unless the cartridge is removed from the camera. With such a structure, even if the back cover is accidentally opened during the photographic mode, the photographed frames are protected since they are now mostly in the film cartridge. Moreover, since the mode switch $SW_M$ remains off even if the back cover is opened, the preliminary winding operation does not follow so that the photographed frames are prevented from being destroyed by exposure to light because they remain in the cartridge.

Now, in order to protect all of the photographed frames from being destroyed by total exposure to light when the back cover of the camera is accidentally opened, the film may be immediately and forcibly rewound into the cartridge by detecting such unwanted opening of the back cover.

Figure 5:
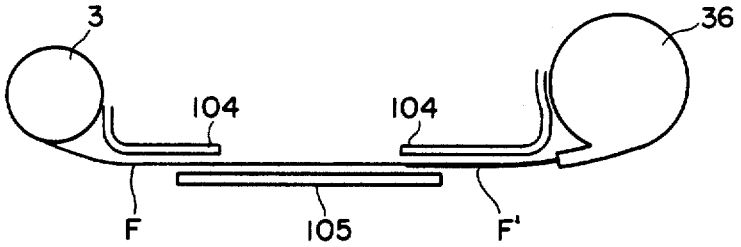
FIG. 5 is a schematic illustration showing the positional relationship among the film cartridge, take-up spool, aperture and film inside a camera.

Referring to FIG. 5, the film F is taken out of the spool 3 and rewound into the cartridge 36 after each photographic operation. The film F is exposed to a light image through an aperture 104 and then rewound into the cartridge 36. As shown, the last photographed frame F' is not completely wound into the cartridge 36. A back plate 105 is provided to maintain the required flatness of the film F at the aperture 104. Thus, since the last photographed frame F' is not yet contained in the cartridge 36, the photographed image of the frame F' will be destroyed when the back cover is opened.

Such a disadvantage may be obviated by bringing the edge of the aperture 104 and the entrance of the cartridge 36 closer together as much as possible. However, this is virtually impossible because of other structural constraints and therefore it is common practice to keep a certain distance between the aperture edge and the cartridge entrance.

Figure 6:
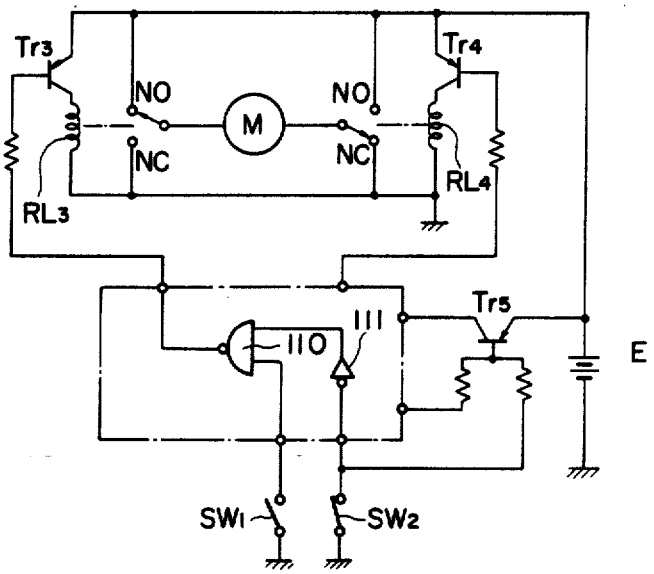
FIG. 6 is a circuit diagram which may function to pull the photographed portion of the film into the cartridge momentarily when the back of the camera is opened accidentally.
Figure 7:
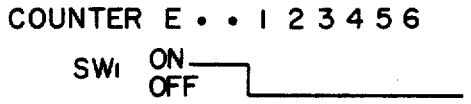
FIG. 7 is a timing chart showing the operation of the counter switch $SW_1$ shown in FIG. 6.
Figure 8:
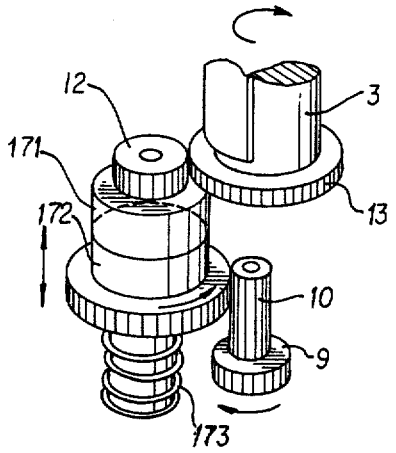
FIG. 8 is a schematic illustration showing a clutch mechanism for detecting an increase in tension of the film F in the final phase of the preliminary winding operation which may be advantageously applied to the present invention.
Figure 9A:
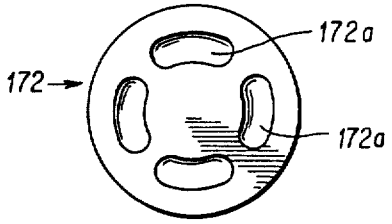
FIGS. 9a and 9b illustrate the mating surface of the driving and driven plates 172 and 171, respectively, forming a part of the clutch mechanism shown in FIG. 8.
Figure 9B:
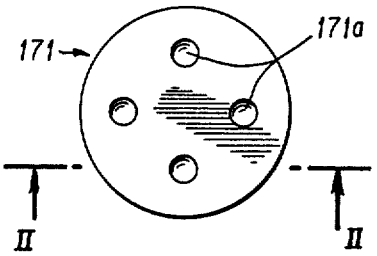
Figure 10:
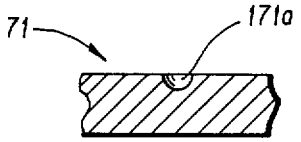
FIG. 10 is a cross-sectional view taken along II—II lines shown in FIGS. 9b.
Figure 11A:
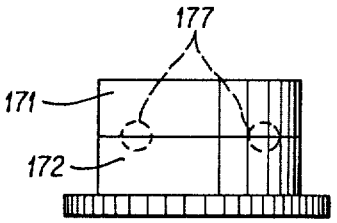
FIGS. 11a and 11b illustrate the condition when the two plates 171 and 172 are in contact and the condition when the two plates 171 and 172 are moved away from each other due to relative rotational motion therebetween, respectively.
Figure 11B:
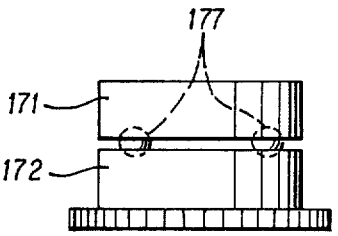

With the foregoing in mind, FIGS. 6 and 7 shown an embodiment which may solve the above problem. As shown in FIG. 6, when the transistor $Tr_3$ is turned on by a control signal from the control circuit, the relay $RL_3$ becomes energized to drive the motor M in the normal direction so that the film F is rewound into the cartridge. On the other hand, when the transistor $Tr_4$ is turned on by a control signal from the control circuit, the relay $RL_4$ becomes energized to drive the motor M in the reverse direction. The reverse rotation of the motor M is used to wind the film having unphotographed frames onto the spool.

The control circuit is designed to control the ON/-OFF condition of the transistors $Tr_3$ and $Tr_4$ and of the transistor $Tr_5$ provided between the power source E and the came circuit (not shown). Here, the control circuit for controlling the ON/OFF condition of the transistor $Tr_3$ based on two inputs will only be described. These two inputs are supplied by the back cover switch $SW_2$ which is turned on when the back cover of the camera is opened and the counter switch $SW_1$ which is turned on when the number of remaining unphotographed frames has reached zero.

The operation of the counter switch $SW_1$ is illustratively shown in FIG. 7. As shown, the switch $SW_1$ remains off as long as there is a frame which has not been used, and it is turned on as soon as all of the frames have been used. The counter switch $SW_1$ is connected to one input of the NAND gate 110 in the control circuit shown by the dotted line, the other input of the NAND gate 110 is connected from the back cover switch $SW_2$ through the inverter 111.

In operation, if the switch $SW_2$ is turned on by opening the back cover with the switch $SW_1$ off, "Hi" is applied to both of the inputs to the NAND gate 110 which, in turn, supplies "Lo" as its output so that the transistor $Tr_3$ is turned on to drive the motor M in the normal direction. As a result, the film F is rewound into the cartridge 36. Such a rewinding operation continues until the film end comes into the cartridge. This is because that portion of the film which was wound around the spool when the back cover was opened is not usable, so it is rather convenient to rewind all of the film into the cartridge for its removal. When the film F has been completely rewound into the cartridge 36, the counter switch $SW_1$ is turned on to supply "Hi" to one input of the NAND gate 110, which then supplies "Hi" as its output to turn the transistor $Tr_3$ off thereby stopping the supply of a current to the motor M.

In this manner, when the back cover is opened the film is rewound into the cartridge 36. It should be noted that such a rewinding operation must be carried out such that at least that portion of the film bearing thereon photographed frames, usually a single frame, located outside of the cartridge must be moved into the cartridge before the light introduced by opening the back cover gets to these frames. It is thus preferable to design such that the motor M is driven to rewind the required portion of the film into the cartridge 36 as quickly as possible when the back cover is opened. It is also preferable to design such that the back cover may not be opened easily. For example, it may be so structured that the back cover may be opened only after operating a plurality of elements or going through a multiple step procedure.

(5) Foolproof Mode of Operation II

This is the mode of operation when a battery is installed into the camera after loading film with a battery. When the back cover is opened, the mode switch $SW_M$ is turned off and the counter displays "E" at the display window. Under the condition, if a film cartridge is already in or introduced, the counter switch $SW_C$ is turned on.

Then when a buttery is installed, a photometric operation will take place if the photometry switch $SW_D$ is on. However, if the counter switch $SW_C$ is on, then even if the release switch $SW_L$ is turned on, "Lo" is applied to one input of the AND gate 81 through the AND gate 82. Therefore the photography inhibit condition is established and no release operation takes place. Similarly with the foolproof mode I, the reason why the photography inhibit condition is established to prevent the release operation from being implemented is that if the release operation were to take place, the rewind end switch $SW_W$ would be turned on upon completion of the shutter operation so that the conditions for the final step rewinding would be satisfied with the switch $SW_C$ on and the switch $SW_M$ off to rewind all of the film F into the cartridge 36.

A brief explanation as to a final step rewinding inhibit signal is in order. The final step rewinding inhibit signal is "Lo" when the power supply circuit is activated by the rewind end switch $SW_W$ and the mode switch $SW_M$, whereas, it is "Hi" when the power supply circuit is activated by the photometry switch or a self-switch (not shown).

As described above, since the main switch $SW_O$ is turned on when the back cover is opened, it is quite rare that the rewind end switch $SW_W$ is on. When installing a battery, if the rewind end switch $SW_W$ is on, though it is extremely rare, the counter switch $SW_C$ is turned on and the mode switch $SW_M$ is turned off thereby establishing the condition for the final step rewinding mode as described in (2) above. However, since the final step rewinding inhibit signal is "Lo" because the power supply circuit has been turned on by the rewind end switch $SW_W$, the output from the NAND gate 91 remains "Hi" and therefore the final rewinding operation does not take place. If it were not for the final step rewinding inhibit signal, if the rewind end switch $SW_W$ is on when the battery is installed and a new film cartridge is loaded, then the final step rewinding operation is carried out to pull all of the leading portion of the film into the cartridge.

In order to avoid such a problem, the final step rewinding inhibit signal becomes "Lo" when the power supply circuit is activated by the rewind end switch $SW_W$ to inhibit the implementation of the final step rewinding operation. That is, if the rewind end switch $SW_W$ is on, the power supply circuit is turned on, and therefore "Lo" is applied to the transistor $Tr_1$ of the film feeding control circuit through the inverter 74, AND gate 94 and NOR gate 85 so that the relay $RL_1$ is energized to drive the motor M in the normal rotational direction and the rewind end switch $SW_W$ is turned off to stop the motor M and to turn off the power supply circuit after feeding the film F over the length of a frame at maximum.

(6) Foolproof Mode of Operation III

This is the mode when a battery is installed after closing the back cover of the camera without a battery and a film cartridge. Bacause of the absence of a film cartridge, the film counter displays " E " and the counter switch $SW_C$ is off. When the battery is installed, the power supply circuit is activated if the rewind end switch $SW_W$ is on and thus the motor M of the film feeding control circuit is driven to rotate in the normal direction. When the film has been advanced over the length of a frame at maximum in this manner, the rewind end switch $SW_W$ is turned off and thus the power supply circuit is deactivated. On the other hand, if the rewind end switch $SW_W$ is off when a battery is installed, then the operation of mode (3) will be implemented.

(7) Foolproof Mode of Operation IV

This is the mode when a battery is installed after loading a film cartridge and closing the back cover. In this case, the operation differs depending on whether the mode switch $SW_M$ is on or off. That is, if the mode switch $SW_M$ is on, then it requires the preliminary winding operation, and this corresponds to the condition where the mode switch $SW_M$ is on in the normal photographic mode (1). Therefore, first the preliminary winding operation takes place and then the photographic operation will follow. If the mode switch $SW_M$ is off, the photographic operation will immediately follow since the preliminary winding has already been completed.

(8) Foolproof Mode of Operation V

This is the mode when the main switch is turned on after having the main switch turned off during the film rewinding operation. In this case, if the rewind end switch $SW_W$ is on, the power supply circuit is activated and the motor M of the film feeding control circuit is driven to rotate in the normal direction to rewind the film into the cartridge. Thus, the displayed number of the film counter is decreased by one and if the displayed number is not "E", then the motor M continues its normal rotation until the rewind end switch $SW_W$ is turned off. When the rewind end switch $SW_W$ is turned off, the photographic operation of the normal mode (1) will be carried out.

If the counter plate displays "E" and the counter switch $SW_C$ is turned on, the motor M continues its normal rotation until the rewind end switch $SW_W$ is turned off. When the rewind end switch $SW_W$ is turned off to deenergize the relay $RL_1$, the motor M stops its rotation and the power supply circuit is deactivated.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

[1. A film feeding system of a camera of the type in which a roll of film inside a film cartridge is first completely wound to a spool of the camera to perform a preliminary winding operation and then the film is rewound into said cartridge one frame after another upon each exposure, said system comprising:

a camera body provided with a film cartridge receiving chamber for-receiving therein a film cartridge containing therein a roll of film and a spool rotatably supported by said body as spaced apart from said chamber, said body including a back cover which may be opened for loading said film cartridge into or unloading it from said chamber;

a reversably rotatable motor which is provided in said body and may be driven to rotate either in a normal or reversed direction;

means for transmitting the driving power of said motor to have said film wound to said spool when said motor is driven to rotate in the reversed direction and then intermittently rewound into said film cartridge when said motor is driven to rotate in the normal direction; and control means for controlling the driving of said motor, said control means including a first switch means having at least first and second conditions for indicating the absence and presence of said film cartridge in said chamber, respectively, a second switch means having at least first and second conditions for indicating the opened and closed conditions of said back cover, respectively, and first driving means, connected to said first and second switch means, for driving said motor to rotate in the reversed direction when said first switch means is in the second condition which indicates the presence of said film cartridge in said chamber and said second switch means is in the second condition which indicates that said back cover is closed, whereby said film is wound to said spool to perform the preliminary winding operation.]

[2. A system of claim 1 wherein said first switch means includes a counter switch which is turned on when said film cartridge is present in said chamber and a portion of said film extends from said film cartridge less than or equal to a predetermined length and which is turned off when said film cartridge is absent from said chamber, and said second switch means includes a mode switch which is turned on when said back cover is closed and which is turned off when said back cover is open.]

[3. A system of claim 2 further including a counter for indicating the frame number of said film, whereby said counter is so structured to indicate zero as long as said counter switch is on because said film cartridge is present in said chamber with said film extending from said film cartridge being less than or equal to a predetermined length.]

[4. A system of claim 2 wherein said first driving means includes first gate means, connected to said counter and mode switches, for allowing current to pass through said motor to cause it to rotate in the reversed direction when both of said counter and mode switches are on.]

[5. A system of claim 4 wherein said first driving means includes checking means, connected between said counter and mode switches and said first gate means, for checking the state of the preliminary winding operation, said checking means stopping the rotation of said motor when the preliminary winding operation is in an inoperative state.]

[6. A system of claim 5 further comprising an alarm unit, connected to said checking means, which generates an alarm signal for a predetermined time period to apprise an operator when the preliminary winding operation is found to be inoperative by said checking means.]

[7. A system of claim 5 wherein said checking means determines that the preliminary winding operation is in an operative state when said counter switch has been detected to be turned off within a predetermined time period.]

[8. A system of claim 7 wherein said checking means includes an AND gate having its first input connected to said counter switch through an inverter, its second input connected to said mode switch through an inverter and its output connected to a first input of a NOR gate through a timer, said OR gate having its second input connected to said counter switch and its output connected to a first input of said first gate means whose second input is connected to said first input of said AND gate, said timer supplying a high level signal at its output for a predetermined time period upon receiving a high level signal at its input.]

[9. A system of claim 1 wherein said control means further includes means for detecting an increase in tension of said film greater than a predetermined level in the final phase of the preliminary winding operation, thereby automatically terminating the preliminary winding operation.]

[10. A system of claim 9 wherein said second switch means includes a mode switch which is turned off when said detecting means has detected an increase in tension of said film greater than said predetermined level.]

[11. A system of claim 1 wherein said control means further includes a third switch means which is operated in association with the shutter operation of said camera and second driving means connected to said first, second and third switch means for driving said motor to rotate in the normal direction to advance said film into said film cartridge when predetermined conditions of said first, second and third switch means are met.]

[12. A system of claim 11 wherein said first switch means includes a counter switch which is turned on when said film cartridge is present in said chamber and a portion of said film extends from said film cartridge less than or equal to a predetermined length and which is turned off when said film cartridge is absent from said chamber, said second switch means includes a mode switch which is turned on when said back cover is closed and which is turned off when said back cover is open, and said third switch means includes a rewind end switch which is turned on upon completion of the shutter operation and turned off when the shutter is reset after said film has been rewound over a single frame.]

[13. A system of claim 12 wherein said second driving means causes said motor to rotate in the normal direction to rewind said film over a single frame as regulated by the operation of said rewind end switch after the shutter release button of said camera is depressed under the conditions that said counter and mode switches remain off.]

[14. A system of claim 12 further comprising a release switch for executing the shutter release operation when actuated and a photometry switch for executing the photometry operation when actuated whereby said photometry switch is actuated when the shutter release button is depressed halfway and said release switch is actuated when the shutter release button is depressed completely.]

[15. A system of claim 14 further comprising means for allowing said shutter release operation to be carried out if said counter switch is off thereby indicating absence of said film cartridge in said chamber and for preventing said shutter release operation from taking place if said counter switch is on thereby indicating presence of said film cartridge in said chamber with said film extending from said film cartridge less than or equal to a predetermined length.]

[16. A system of claim 12 wherein said second driving means causes said motor to rotate in the normal direction over the length corresponding to a predetermined number of frames when said counter switch is turned off during rewinding the last frame of said film upon turning on of said rewind end switch under the conditions that said mode and counter switches are initially off, whereby the leading section of said film is automatically and completely rewound into said cartridge when the final frame of said film has been used.]

*17. In a camera in which film is continuously wound onto a spool from a film magazine loaded into the camera, and the film is rewound into the magazine frame by frame during its exposure, said camera being operable with a direct power supply and comprising:*

*a motor to drive either the spool or the magazine shaft depending on the direction of the power supply;*

*control means for retaining the motor in a state in which power is supplied thereto continuously for rewinding the film into the magazine when no film frames allowing exposure are left;*

*wherein the control means includes switching means closed to effect the power supply to the motor when the direction of power supply to the motor is for driving the magazine shaft, and a switch drum for closing the switching means when no film frames are allowing exposures are left, said camera further comprising:*

*a sprocket,*

*a counter associated with the switch drum for indicating a number of film frames, said counter being biased for returning to its initial position,*

*transmitting means for transmitting rotation of the sprocket to the switch drum and the counter, and*

*detection means for detecting loading of the magazine and placing the transmitting means in a non-transmitting state.*

*18. A camera, wherein film is continuously wound onto a spool from a film magazine loaded into .he camera, and exposures are made as the film is rewound into the magazine frame by frame, said magazine having a shaft; said camera being operable by a directional power supply and comprising:* a motor for driving one of the spool and the shaft of the magazine depending on the direction of the power supply, and

*change over means to detect completion of the take up of the film by the spool and for changing the direction of the power supply to the motor from a spool driving direction to a direction for driving the magazine shaft.*

*19. A camera according to claim 18, wherein the motor is arranged to apply a torque to the spool and the change over means is arranged for detecting variation in the torque applied to the spool for controlling the direction of the power supply to the motor.*

* * * * *